United States Patent
Mahar et al.

(10) Patent No.: US 11,425,245 B2
(45) Date of Patent: Aug. 23, 2022

(54) METHOD AND SYSTEM FOR CAPTURING DATA OF ACTIONS

(71) Applicant: salesforce.com, inc., San Francisco, CA (US)

(72) Inventors: Molly Mahar, Oakland, CA (US); Nicholas Beng Tek Geh, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/678,530

(22) Filed: Nov. 8, 2019

(65) Prior Publication Data

US 2021/0144250 A1 May 13, 2021

(51) Int. Cl.

| H04M 3/42 | (2006.01) |
|---|---|
| H04L 51/02 | (2022.01) |
| H04L 51/046 | (2022.01) |
| H04M 3/53 | (2006.01) |
| H04M 3/523 | (2006.01) |
| H04L 51/234 | (2022.01) |

(52) U.S. Cl.
CPC ........ *H04M 3/42382* (2013.01); *H04L 51/02* (2013.01); *H04L 51/046* (2013.01); *H04L 51/34* (2013.01); *H04M 3/5233* (2013.01); *H04M 3/5307* (2013.01); *H04M 3/5322* (2013.01)

(58) Field of Classification Search
CPC ........... H04M 3/42382; H04M 3/5233; H04M 3/5307; H04M 3/5322; H04M 3/493; H04M 2203/552; H04M 2203/651; H04M 3/527; H04L 51/34; H04L 51/02; H04L 51/046; H04L 51/04
See application file for complete search history.

(56) References Cited

U.S. PATENT DOCUMENTS

| 10,470,025 | B1* | 11/2019 | Hunt, III | G07C 5/008 |
|---|---|---|---|---|
| 10,764,431 | B1* | 9/2020 | Pham | G06F 16/355 |
| 2002/0124018 | A1* | 9/2002 | Fifield | G06F 40/169 |
| | | | | 715/205 |
| 2003/0017836 | A1* | 1/2003 | Vishwanathan | H04L 29/06 |
| | | | | 455/520 |
| 2015/0312427 | A1* | 10/2015 | Roulland | G06F 11/0793 |
| | | | | 358/1.15 |
| 2016/0014059 | A1* | 1/2016 | Rathod | H04L 51/046 |
| | | | | 715/752 |
| 2018/0212904 | A1* | 7/2018 | Smullen | H04L 63/18 |
| 2018/0285595 | A1* | 10/2018 | Jessen | H04L 67/14 |
| 2019/0108494 | A1* | 4/2019 | Nelson | G06Q 10/109 |

\* cited by examiner

*Primary Examiner* — Brandon J Miller
(74) *Attorney, Agent, or Firm* — Sterne, Kessler, Goldstein & Fox P.L.L.C.

(57) ABSTRACT

Described herein is a system and method for capturing data associated with actions attempted by an automated agent. The system described herein captures data associated with the actions attempted by an automated agent during the messaging session between an automated agent and the user and present a summary of the actions in a messaging platform. In an embodiment, the automated agent uploads data associated with actions attempted during the messaging session to a server. The server captures the data associated with the actions and generates a description of each action that was attempted. The server generates a summary including the description of each action. The summary of the actions are rendered in the messaging platform.

18 Claims, 5 Drawing Sheets

METHOD AND SYSTEM FOR CAPTURING DATA OF ACTIONS

BACKGROUND

Entities such as retailers and corporations may implement automated agents to resolve any issues users may have. The automated agents may be configured to communicate with the user and execute certain tasks in response to the user's communication. When an automated agent is unable to perform a task the automated agent may transfer the case to a human agent. Human agents may be divided in different tiers. The tiers may be may be organized by complexity of the matters handled along with the areas of focus such as sales, service, or by region. The agents may be responsible for handling different issues. Both automated and human agents will transfer cases to other human agents which they are unable to resolve.

Currently, when an automated agent or human agent transfers a chat or messaging conversation to a different human service agent, the different human agent takes over the conversation and can is able to view the chat/messaging area including communication between the automated agent and the user. However, the different human agent would need to read the entire transcript to understand what happened, and even then would not necessarily know exactly which were executed by the automated agent or previous human agent without consulting the case record or other applicable records for the customer. This is because the transcript only contains the text of the communication between the automated agent or previous human agent and the user. This may take extra time for the agent to get up to speed on the issue and provide the service necessary to the customer to resolve the issue. The human agent may have to execute multiple queries and/or data pulls, to retrieve information before attending to the user's issue. When dealing with large amounts of users interfacing with automated agents, can lead to an exponential amount of querying causing network congestion and excessive use of computational resources.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for capturing data of executed actions.

When attempting to resolve various issues with an entity, a user may contact an agent of the entity. The entity may be a retail store, corporations, educational institution, government office, and/or the like. The initial agent may be an automated agent or automated script. The automated agent may communicate with the user using a messaging platform. The messaging platform may be a phone conversation or online chat conversation. The automated agent may be able to resolve specified issues for the customer. As a non-limiting example, the automated agent may change a billing address, payment device, delivery time, and/or the like. These actions may take place during the messaging session, however, human agents may be unaware that these actions were executed during the messaging session. In view of this, if the same user attempted to communicate a different issue to a human agent, the human agent may have to execute multiple queries and/or data pulls, to retrieve this information before attending to the user's issue. When dealing with large amounts of users interfacing with automated agents, can lead to an exponential amount of querying causing network congestion and excessive use of computational resources. Furthermore, it may take a human agent an excessive amount of time reading the transcript and figuring out the actions that were attempted by the automated agent.

To resolve this issue, the system described herein may capture data associated with the actions that were attempted by an automated agent during the messaging session between the automated agent and the user and present a summary of the actions in the messaging platform. In particular, the automated agent may upload data associated with the attempted actions during the messaging session to a server. The server may capture the data associated with the actions and generate a description of each action that was executed. The server may generate a summary including the description of each action. The summary of the actions may be rendered in the messaging platform to be viewed by any human agent with access to the messaging platform.

The system eliminates the need for executing multiple queries to determine what actions were attempted during messaging session between a user and an automated agent. By doing so, the system saves use of computational resources and avoids network bottlenecks, by excessive querying.

Figure 1:
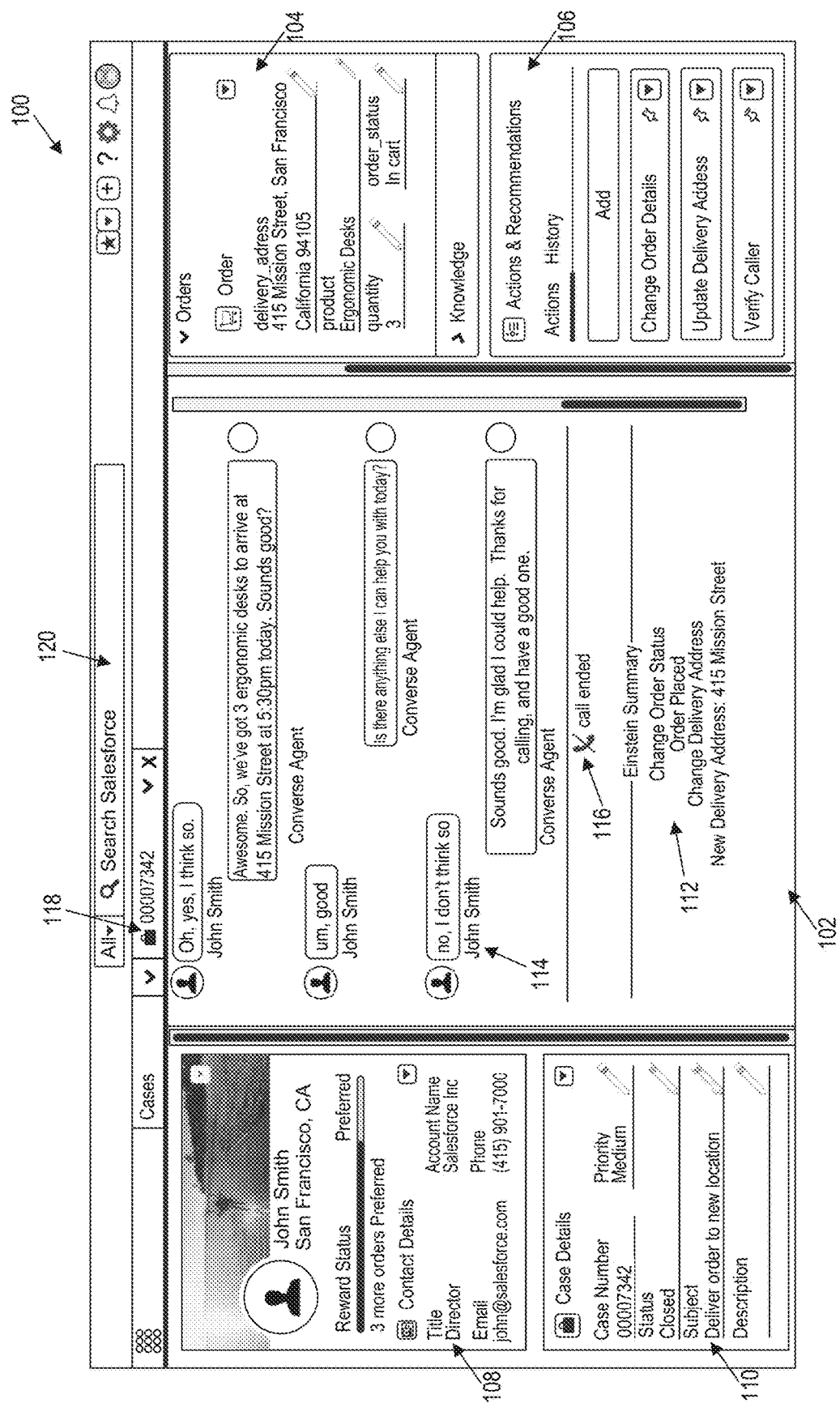
FIGS. 1-2 are example graphical user interfaces (GUIs) indicating a summary of actions in a messaging session according to an exemplary embodiment.
Figure 2:
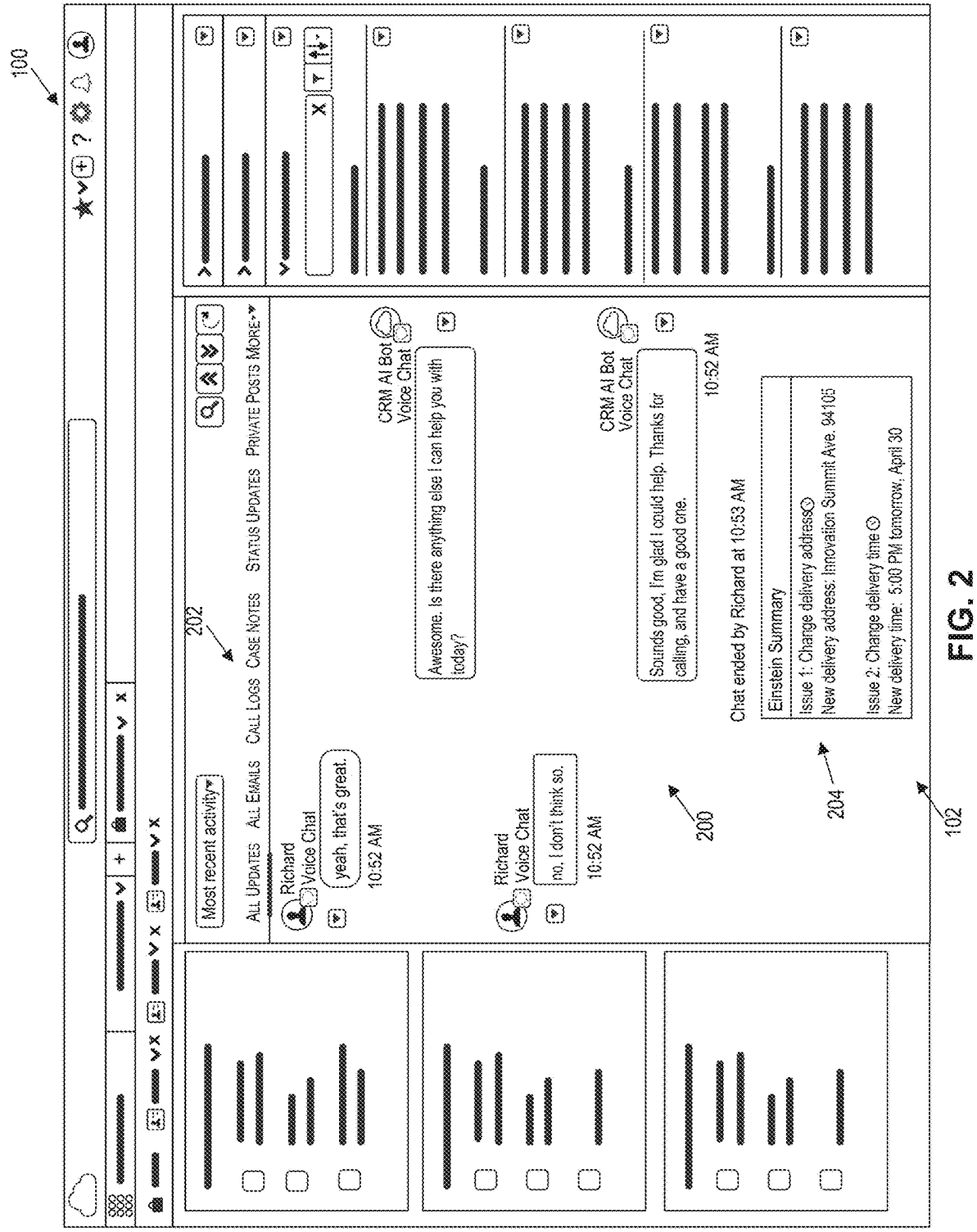

FIGS. 1-2 are example messaging platform indicating a summary of actions in a messaging session according to an exemplary embodiment. As described above, when attempting to resolve various issues with an entity, a user may contact an agent of the entity. With respect to FIG. 1, the entity may employ an automated agent to communicate with the user to resolve certain issues on a messaging platform 100. The messaging platform 100 may be rendered on a GUI viewable by agents of the entity. The messaging platform 100 support representative over the phone or using online chat tool. The messaging platform 100 may include a messaging window 102, user order information 104, actions recommendations 106, user information 108, case details 110, the action summary 112, communication 114 between the automated agent and user, and a case number 118. It can be appreciated that the components of the messaging platform 100 may be formatted and positioned in different ways.

The order information 104 and actions and recommendations 106 may be positioned on one side of the messaging window 102 on the GUI. The user information 108 and case details 110 may be positioned on the other side of the messaging window 102. The messaging window 102 may reside in a middle of the order information 104 and actions and recommendations 106 and user information 108 and case details 110. The case number 118 may be positioned above the messaging window 102. The case number 116 may be rendered in a window tab of the messaging window 102. An agent may view a different messaging window 102 by selecting a new case number using the window tab drop down menu. A search input box 120 may be rendered on the top of the messaging platform.

The order information 104 may include any products the user may have ordered from the entity in the event the entity is a retail store. The order information 104 may include a delivery address, product information, quantity, and order status.

The actions and recommendations 106 may include recommended actions to be executed based on the communication 114 between the user and the automated agent or executed actions during a messaging session in the messaging window 102. The actions and recommendations 106 may also include a history of executed actions for that user.

The user information 108 may include the user name, location, contact details, and a reward status. The contact details may include title, account name, email address, and phone number.

The case details 110 may include case number, priority, status, subject and a description. The case details 110 may relate to the issue being resolved by the automated agent.

The messaging window 102 may include communication 114 between the user and the automated agent during a messaging session. The messaging session may be via phone call or online chat tool, however, the messaging platform 100 may transcribe the messaging session in alphanumeric text and render the alphanumeric text in the messaging window.

In an embodiment, the automated agent may preform various actions at the request of the user or based on communication with the user, during the messaging session. For example, during the messaging session, the automated agent may change the order status from "In cart" to "Order Placed" in response to the user completing a transaction for a product. The automated agent may also change the delivery address for the order from "1 Market Street" to "415 Mission Street". Each of these actions may require updating a separate database. Furthermore each of these actions may include data (or metadata) describing the content of the action.

An indicator 116 may be rendered in the messaging window indicating the termination of the messaging session or communication between the automated agent and the user. At the termination of the communication between the automated agent and the user, the automated agent may upload the data associated with these actions to a server. The server may generate descriptions of the actions using the data and generate the action summary 112 including the descriptions. The action summary 112 may be rendered in the messaging window 102. The action summary 112 may include a description of the requested action and the description itself. For example, the action summary 112 may include the strings "Change Order Status"; "Order Placed"; "Change Delivery Address"; and "New Delivery Address: 415 Mission Street". A transcript of the messaging session including the communication 114 and the action summary 112 may be stored in a database and associated with the case number 118. In an embodiment, the automated agent may upload the data associated with the action to the server, as the action is executed. The order information 104 may include the updated delivery address.

With reference to FIG. 2, the messaging platform 100 may include messaging window 102, communication 200, a menu 202, and an action summary 204. The communication 200 may include communication between the automated agent and the user. The communication 200 may indicate the whether the user is communicating with the automated agent using voice or text. The menu 200 may include all the recent activity for the user. For example, the menu 200 may include all updates, all emails, call logs, case notes, status updates, private posts, and/or the like.

The action summary 204 is rendered in the messaging window 102. The action summary 204 may be rendered within an outlined box titled "Einstein Summary". The action summary 204 may include a description of each issue that was brought up during the communication 200 and an executed action. The action summary 204 may further render a visual indicator 206 indicating success or failure of resolving the issue, adjacent to the description of the issue. As a non-limiting example, the action summary 204 may include "Issue 1: Change delivery address". A visual indicator 206 indicating a successful change of the delivery address may be rendered adjacent to "Issue 1: Change delivery address". The action summary 204 may further render "New delivery address: Innovation Sumit Ave. 94105" below "Issue 1: Change delivery address" as it corresponds to the action taken in for resolving "Issue 1: Change delivery address". The action summary 204 may further render "Issue 2: Change delivery time". A visual indicator 206 indicating successfully changing the delivery time may be rendered adjacent to "Issue 2: Change delivery time". The action summary 204 may further render "New delivery time: 5:00 PM tomorrow, April 30" below "Issue 2: Change delivery time" as it corresponds to the action taken to resolve "Issue 2: Change delivery time".

Figure 3:
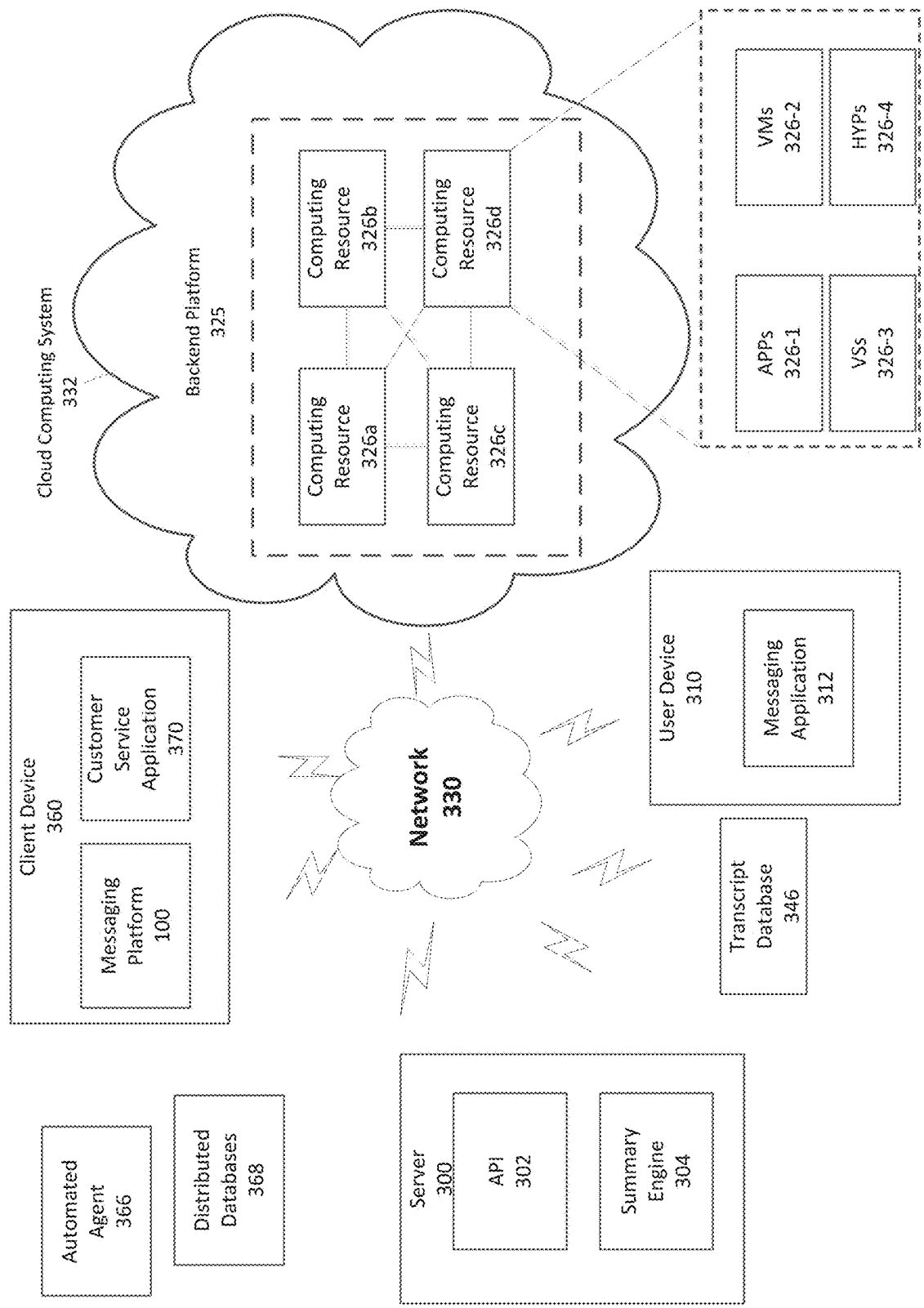
FIG. 3 is a block diagram of an example environment in which systems and/or methods described herein may be implemented according to an example embodiment.

FIG. 3 is a block diagram of an example environment in which systems and/or methods described herein may be implemented. The environment may include a server 300, a user device 310, a client device 360, transcript database 346, an automated agent 366, distributed databases 368, a backend platform 325, a cloud computing environment 332, and a network 330. The devices of the environment may be connected through wired connections, wireless connections, or a combination of wired and wireless connections.

In an example embodiment, one or more portions of the network 330 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 325 may include one or more devices configured to host the messaging platform 100. The backend platform 325 may include a server or a group of servers. In an embodiment, the backend platform 325 may be hosted in a cloud computing environment 332. It may be appreciated that the backend platform 325 may not be cloud-based, or may be partially cloud-based.

The server 300, the automated agent 366, the distributed database 368, the client device 360, and the transcript database 346 may include one or more devices configured to interface with the backend platform 325. The server 300 may include an API 302 and a summary engine 304. The server 300 may be embodied as a Representational State Transfer (REST) server. The user device 310 may execute a messaging application 312 to interface with the client device 360. The messaging application 312 may be an application configured to initiate voice or text messaging. The client device 360 may include a messaging platform 100 and a customer service application 370. The customer service application 370 may receive requests from users to communicate with an agent to resolve an issue. The customer service application 370 may interface with automated and human agents to initiate a messaging session with the user. The messaging platform 100 may be a messaging service including a GUI rendering communication between a user and an entity's agent.

In an embodiment, user may communicate with an entity's agent using the messaging application 312. The communication may be captured and rendered in the messaging platform 100 as alphanumeric text. In one embodiment, the agent may communicate with the messaging application 312 using the messaging platform 100. Alternatively, the agent may communicate with a user using a telephone. The client device 360 and messaging platform 100 may be communicatively coupled to the telephone and configured to capture and render the phone conversation in alphanumeric text in the messaging platform 100. The automated agent 366 may be an automated script or executable program. The automated agent 366 may be a customer service representative configured to communicate with the user through the messaging platform 100 or the phone.

The transcript database 346 may store transcripts of communication between users and agents of an entity. The distributed databases 368 may be an entity's databases storing different types of information. For example, one of the distributed databases 368 may store purchase orders, another database of the distributed databases 368 may store user information, while another database of the distributed databases 368 may store product information.

The cloud computing environment 332 includes an environment that delivers computing as a service, whereby shared resources, services, etc. may be provided to the client device 360 and/or the backend platform 325. The cloud computing environment 132 may provide computation, software, data access, storage, and/or other services that do not require end-user knowledge of a physical location and configuration of a system and/or a device that delivers the services. The cloud computing system 332 may include computing resources 326a-d.

Each computing resource 326a-d includes one or more personal computers, workstations, computers, server devices, or other types of computation and/or communication devices. The computing resource(s) 326a-d may host the backend platform 325. The cloud resources may include compute instances executing in the computing resources 326a-d. The computing resources 126a-d may communicate with other computing resources 126a-d via wired connections, wireless connections, or a combination of wired or wireless connections.

Computing resources 326a-d may include a group of cloud resources, such as one or more applications ("APPs") 326-1, one or more virtual machines ("VMs") 326-2, virtualized storage ("VS") 326-3, and one or more hypervisors ("HYPs") 326-4.

Application 326-1 may include one or more software applications that may be provided to or accessed by user device 310 or the client device 360. In an embodiment, the messaging platform 100 may be executed locally on the client device 360 and the messaging platform 312 may be executed locally on the user device 310. Alternatively, the application 326-1 may eliminate a need to install and execute software applications on the user device 310 and client device 360. The application 326-1 may include software associated with backend platform 125 and/or any other software configured to be provided across the cloud computing environment 332. The application 326-1 may send/receive information from one or more other applications 326-1, via the virtual machine 326-2.

Virtual machine 326-2 may include a software implementation of a machine (e.g., a computer) that executes programs like a physical machine. Virtual machine 326-2 may be either a system virtual machine or a process virtual machine, depending upon the use and degree of correspondence to any real machine by virtual machine 326-2. A system virtual machine may provide a complete system platform that supports execution of a complete operating system (OS). A process virtual machine may execute a single program and may support a single process. The virtual machine 326-2 may execute on behalf of a user and/or on behalf of one or more other backend platforms 325, and may manage infrastructure of cloud computing environment 332, such as data management, synchronization, or long duration data transfers.

Virtualized storage 326-3 may include one or more storage systems and/or one or more devices that use virtualization techniques within the storage systems or devices of computing resource 326a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 326-4 may provide hardware virtualization techniques that allow multiple operations systems (e.g., "guest operating systems") to execute concurrently on a host computer, such as computing resource 326a-d. Hypervisor 326-4 may present a virtual operating platform to the guest operating systems, and may manage the execution of the guest operating systems multiple instances of a variety of operating systems and may share virtualized hardware resources.

In an embodiment, a user may attempt to communicate with an entity's customer service representative using the messaging application 312 to resolve issues. Alternatively, the user may also communicate with the entity's customer service representative using the telephone. In response to receiving a communications request from a user (via messaging application or telephone), the client device 360 may execute the customer service application 370. The customer service application 370 may receive the request to communicate and instruct the automated agent 366 or a human agent to communicate with the user, via the messaging platform 100 or telephone. The customer service application 370 may initiate a messaging session between the automated agent 366 and the user.

The automated agent 366 may be an automated script or executable configured to communicate with the user. The automated agent 366 may use the messaging platform 100 or telephone to communicate with the user. The automated agent 366 may use Natural Language Processing (NLP) to parse and process the user's communication with the automated agent 366. The automated agent 366 may also use a voice recognition service which can recognize words spoken by a user. The automated agent 366 may respond to the user's communication. The communications may include messages that send information to the users or questions that ask customers for further information. The communications may be based off of pre-generated templates including variables to be filled in dynamically based on the communication with the user. The automated agent 366 may identify a user's intent or request based on key words in the user's communication. The automated agent 366 may save these key words as the key words may be used to fill in the variables of the templates in future communication. For example, a user may say or type, "Hi my name is Mark Smith." The automated agent 366 may recognize Mark Smith as the user's name based on "Mark" and "Smith" following the word "name", and store Mark Smith for future communication. The automated agent 366 may responds to the user by using a template "Hello, [first name] [last name]." the automated agent 366 may retrieve the user's name based on the user's earlier message and fill in the first name and last name variables of the template. The automated agent 366 may respond "Hello, Mark Smith."

The automated agent 366 may also perform actions based on the communication with the user. For example, the automated agent 366 may execute queries, commits, generate a case for the user's issue, and/or the like. The automated agent 366 may interface with the distributed databases 368 to perform the actions. The automated agent 366 may interface with or be communicatively coupled to the client device 360. Alternatively, the automated agent 366 may reside on the client device 360. As non-limiting examples, the automated agent 366 may be Converse (developed by EngageOne®) or Einstein Bots (developed by Salesforce-.com, Inc. headquartered in San Francisco, Calif.).

As a non-limiting example, the client device 360 may be operated by an entity such as a retailer. A user may attempt to communicate with an agent using the messaging application 312 or using a telephone to change a preferred payment device. In an embodiment, the user device 310 may be a telephone.

The client device 360 may receive the attempt (or request) to communicate with the user. The client device 360 may execute customer service application 370. The customer service application 370 may instruct an automated agent 366 to communicate with the user. The customer service application 370 may also launch the messaging platform 100 and associate the automated agent 366 to the user so that the messaging platform 100 may capture the communication between the automated agent 366 and the user. The customer service application 370 may initiate a messaging session between the automated agent 366 and the user. The messaging platform 100 may transcribe and render the alphanumeric strings of the communication between the use and the automated agent 366 in the messaging session.

The user may communicate with the automated agent 366 that the user wants to change their preferred payment device to a new credit card than the one on file. The automated agent 366 may recognize that the user wants to change their preferred payment device to a new credit card. The automated agent 366 may generate a new case tied to the user, to change their preferred payment device. The automated agent 366 may identify the database from the distributed databases 368 in which the payment device information is stored. The automated agent 366 may update the database with the new credit card information for the user as their preferred payment device. The update the executed by the automated agent 366 may have metadata or data describing the content of the action.

The user or the automated agent 366 may terminate the communication or messaging session once the preferred payment device is updated. At the termination of the communication, the automated agent 366 may upload the request and data describing the content of the action to the server 300. The API 302 may receive the request and data describing the content of the action. The summary engine 304 may generate a description of the update of the preferred payment device based on the data. In an embodiment, the data may be an event object. The summary engine 304 may identify the type of event object and generate a description of the event based on the type of event object. The type of event objects may be defined by the entity itself. Types of event objects may be, change of address, change of payment device, change in other user information, and/or the like. Alternatively, the summary engine 304 may parse the data to identify the description of the event.

The summary engine 304 may generate a summary (e.g., action summary) including the request and the action resolving the request. In this case the summary may include "change preferred payment device" and the action may be "preferred payment device: New payment device". The summary engine 302 may interface with the messaging platform 100 to render the summary in the messaging session in the messaging platform 100.

The messaging session may include the communication between the automated agent 366 and the user and the summary. A transcript of the messaging session may be stored in the transcript database 346. This way, a human agent may retrieve the transcript of the communication between the automated agent 366 and the user at a later date to determine what actions were attempted during the messaging session.

The automated agent may upload the data associated with the action as a conversation entry object to be used in Conversations 1.0 or 2.0. The conversation entry object may include a flag indicating that the uploaded conversation entry object is related to an action rather than a communication between the automated agent 366 and user. The data may also be uploaded as in an event-driven messaging architecture. The automated agent 366 may publish defined events describing the attempted action, on the server 300. The summary engine 304 may subscribe to the events transmitted by the automated agent 366, so that the summary engine 304 may receive the defined events. As an example, event-driven messaging architecture may be Platform Events (developed by Salesforce.com, Inc.).

As another non-limiting example, the client device 360 may be operated by an entity such as a retailer. A user may attempt to communicate with an agent using the messaging application 312 or using a telephone to change product purchased by the user before the product is delivered to the user's address.

The client device 360 may receive the attempt (or request) to communicate with the user. The client device 360 may execute customer service application 370. The customer service application 370 may instruct an automated agent 366 to communicate with the user. The customer service application 370 may also launch the messaging platform 100 and associate the automated agent 366 to the user so that the messaging platform 100 may capture the communication between the automated agent 366 and the user.

The user may communicate with the automated agent 366 that the user wants to change a product purchased by the user to a new product before the product is delivered to the user's address. The automated agent 366 may recognize that the user wants to change the product purchased by the user to a new product before the product is delivered to the user's address. The automated agent 366 may generate a new case tied to the user, to change product purchased by the user before the product is delivered to the user's address. The automated agent 366 may determine that to resolve this request the order for the originally purchased product must be canceled and then a new order for the new product may be generated.

The automated agent 366 may first determine whether the originally purchased product has already been sent out for delivery by querying a first database of the distributed databases 368. In the event, the product has not yet been send out for delivery, the automated agent 366 may query a second database of the distributed databases 368 to determine whether the new product is available. In the event the new product is available and can be ordered in place of the originally purchased product, the automated agent 366 may update the second database and any other respective database in the distributed databases 368 to cancel the order of the originally purchased product and generate a new order for the new product.

The user or the automated agent 366 may terminate the communication or messaging session once the purchase of the originally purchased product is canceled and a new order for the new product is generated. At the termination of the communication, the automated agent 366 may upload the request and data describing the content of the actions executed to the server 300. As an example, the executed actions may include canceling the order originally purchased product and generating a new order for the new product. The uploaded data may also include a time of when the action was executed. The API 302 may receive the request and data describing the content of the actions. The summary engine 304 may generate a description of the canceling of the order of the originally purchased product and the generating the new order for the new product. The summary engine 304 may generate a summary (e.g., action summary) including the request and the actions resolving the request. The summary engine 304 may use the time of the executed actions to list the description of the actions in chronological order in the summary. In this case the summary may include "change originally purchased product with the new product" and the actions may be "cancel the order for the originally purchased product" and "generate new order for the new product". The summary engine 302 may interface with the messaging platform 100 to render the summary in the messaging session in the messaging platform 100.

The messaging session may include the communication between the automated agent 366 and the user and the summary. A transcript of the messaging session including the communication and the summary may be stored in the transcript database 346.

In the event, the order of the originally purchased product may not be canceled, the automated agent 366 may transfer the case to a human agent as the automated agent 366 may not resolve the issue. The automated agent 366 may terminate the communication with the user. In response to terminating the communication, the automated agent 366 may upload the data associated with the attempted action. The summary engine 304 may generate a description of the attempted action and include it in a summary. In this case, the summary may include "change originally purchased product with the new product" and the actions may be "failed to cancel the order for the originally purchased product". The summary engine 302 may interface with the messaging platform 100 to render the summary in the messaging session in the messaging platform 100.

In one embodiment, the human agent may access the messaging platform 100 including the summary of the attempted action. In another embodiment, the transcript of the messaging session including communication and the summary may be stored in the transcript database 346. The human agent may use the customer service application 370 to query the transcript database to retrieve the transcript.

Figure 4:
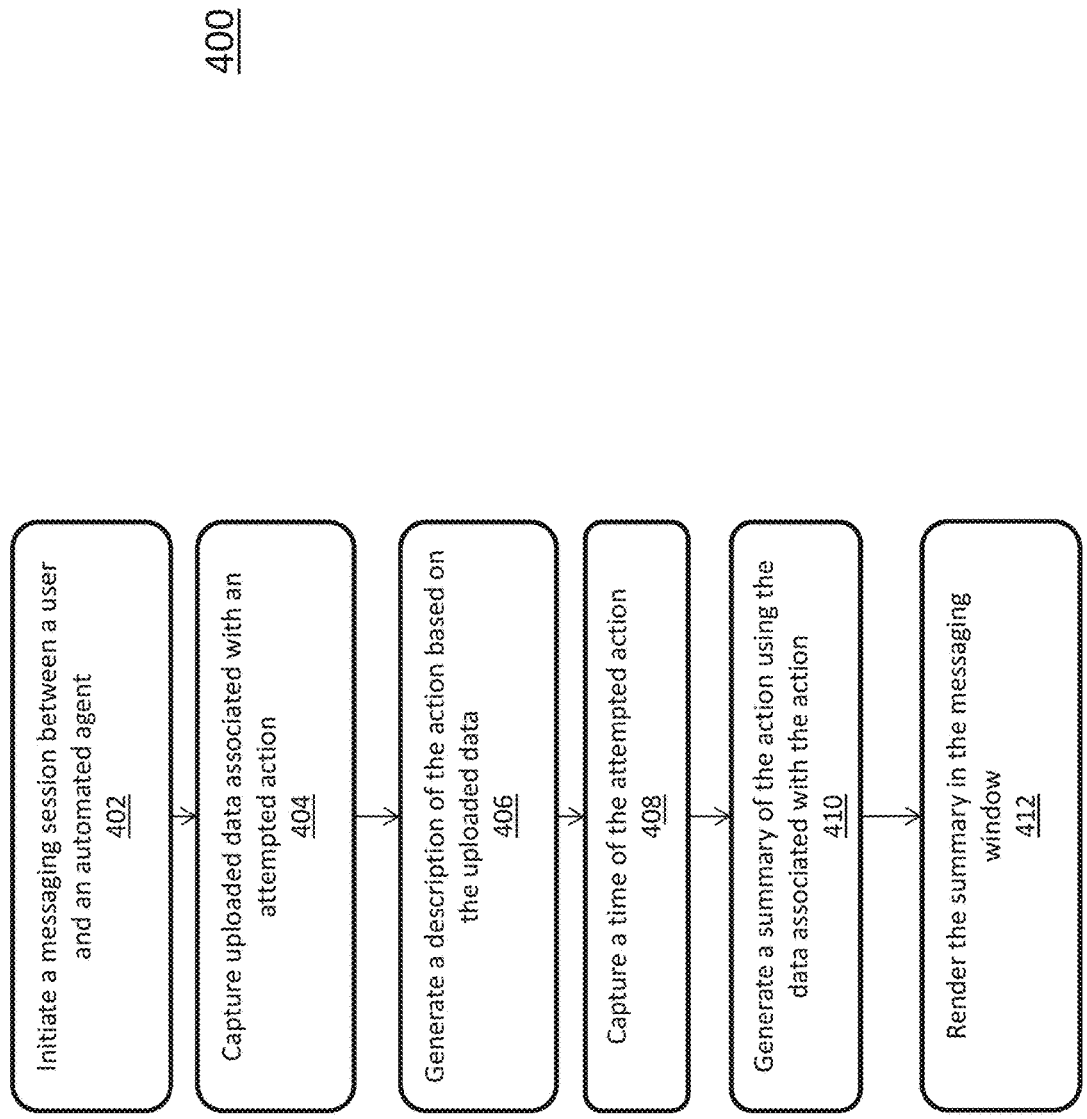
FIG. 4 is a flowchart illustrating the process of capturing data of executed actions in accordance to an example embodiment.

FIG. 4 is an example flowchart 400 for capturing data associated with executed actions. It can be appreciated that the summary of the executed actions may be generated at the termination of the communication between a human agent and the user. It is to be appreciated the operations may occur in a different order, and some operations may not be performed. Merely as an example, the flow of data will be described with respect to FIG. 3.

In operation 402, a messaging platform may initiate a messaging session between a user and an automated agent in response to the user requesting to communicate with an entity associated with the automated agent. The user may need to resolve an issue with the entity and the entity may instruct the automated agent to assist the user to resolve the issue. The automated agent may execute actions to resolve the user's issue. The automated agent may upload data associated with executing the actions to a server.

In operation 404, a server may capture uploaded data associated with an action attempted by the automated agent for the user. The data may also include a time when the automated agent attempted to execute the action.

In operation 406, the server may generate a description of the action based on the uploaded data. The uploaded data may be an event data object. The server may identify the description based on the event data object.

In operation 408, the server may capture the time of the action was attempted.

In operation 410, the server may generate a summary including the description of the action. In the event there is more than one action, the summary may list the actions in chronological order based on the time of the executed action.

In operation 412, the server may render the summary in the messaging window at the termination of the communication between the user and the automated agent.

Figure 5:
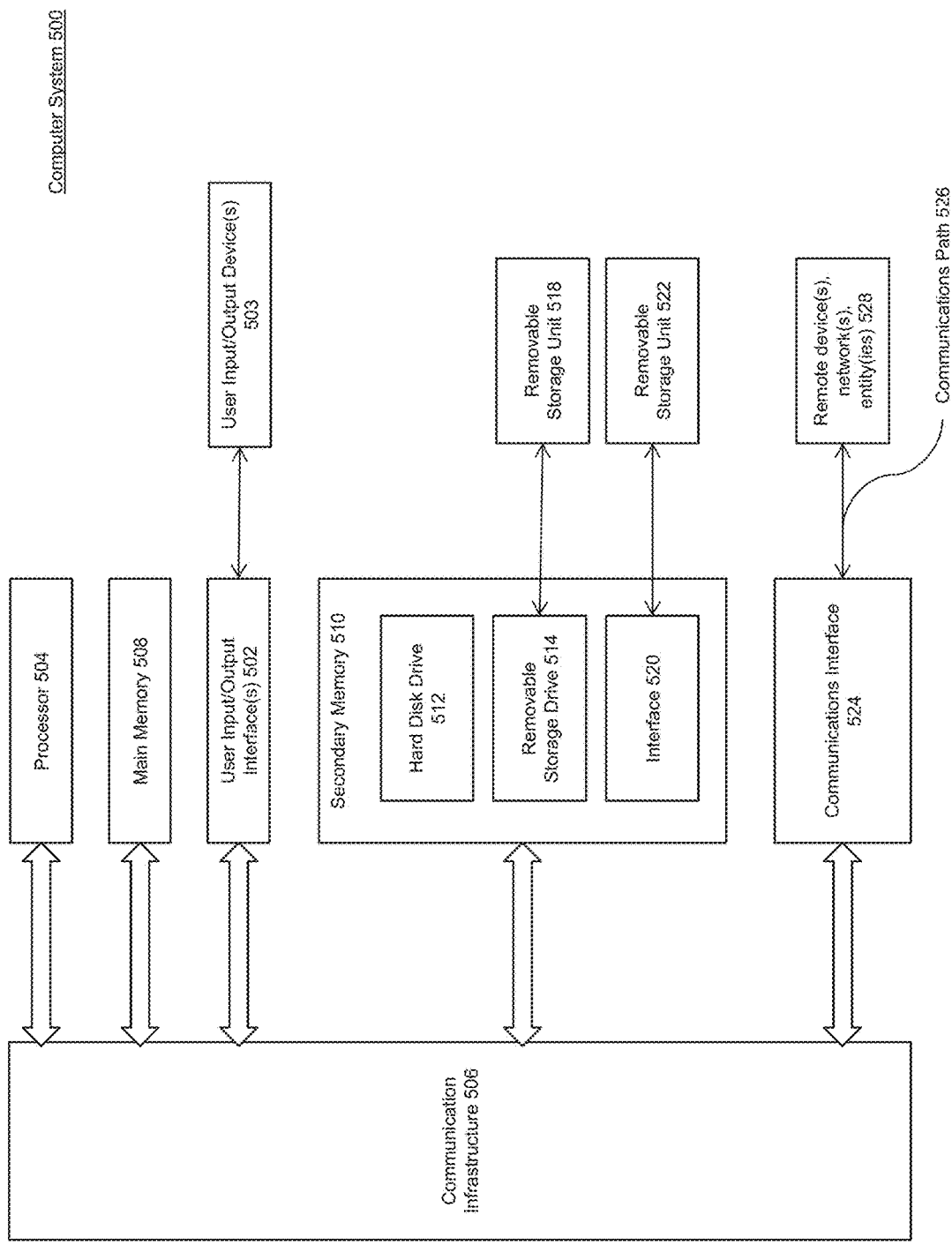
FIG. 5 is a block diagram of example components of a computing system according to an embodiment.

FIG. 5 is a block diagram of example components of device 500. One or more computer systems 500 may be used, for example, to implement any of the embodiments discussed herein, as well as combinations and sub-combinations thereof. Computer system 500 may include one or more processors (also called central processing units, or CPUs), such as a processor 504. Processor 504 may be connected to a communication infrastructure or bus 506.

Computer system 500 may also include user input/output device(s) 503, such as monitors, keyboards, pointing devices, etc., which may communicate with communication infrastructure 506 through user input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 308, such as random access memory (RAM). Main memory 308 may include one or more levels of cache. Main memory 308 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514.

Removable storage drive 514 may interact with a removable storage unit 518.

Removable storage unit 518 may include a computer usable or readable storage device having stored thereon computer software (control logic) and/or data. Removable storage unit 518 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 308, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the invention that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   initiating, by one or more computing devices, a messaging session between a user and an automated agent;
   receiving, by the one or more computing devices, data indicating that the automated agent has attempted to execute a plurality of actions to resolve a request from the user, wherein the request is specified in a communication from the user during the messaging session;
   generating, by the one or more computing devices and based on the data, a summary comprising:
   the request;

a description of the plurality of actions; and a failure message regarding a first action of the plurality of actions that failed to execute;

inserting, by the one or more computing devices, the summary into a transcript of messages exchanged between the user and the automated agent during the messaging session in response to termination of the messaging session between the user and the automated agent;

generating a user interface that includes a messaging window within which the messaging session is displayed to a live agent; and displaying the summary in the messaging window upon termination of the messaging session.

2. The method of claim 1, wherein the automated agent attempts to execute the plurality of actions in a backend computing system.

3. The method of claim 1, wherein the automated agent uploads the data associated with the plurality of actions to a server at the termination of the messaging session.

4. The method of claim 1, further comprising capturing, by the one or more computing devices, a time when the first action was attempted, based on the uploaded data.

5. The method of claim 1, further comprising displaying, by the one or more computing devices, a visual indicator indicating a successful execution of a second action of the plurality of actions in the summary, wherein the visual indicator is displayed adjacent to the description.

6. The method of claim 1, further comprising storing, by the one or more computing devices, the transcript of the communication between the user and the automated agent.

7. The method of claim 1, further comprising:

sending, in response to the automated agent failing to execute the first action, the transcript comprising the summary to a human agent to determine the plurality of actions that were attempted by the automated agent during the messaging session.

8. A system comprising:

a memory;

a processor copulated to the memory, the processor configured to:

initiate a messaging session between a user and an automated agent;

receive data indicating that the automated agent has attempted to execute a plurality of actions to resolve a request from the user, wherein the request is specified in a communication from the user during the messaging session;

generate, based on the data, a summary comprising:
the request;
a description of the plurality of actions; and
a failure message regarding a first action of the plurality of actions that failed to execute;

insert the summary into a transcript of messages exchanged between the user and the automated agent during the messaging session in response to termination of the messaging session between the user and the automated agent;

generate a user interface that includes a messaging window within which the messaging session is displayed to a live agent; and display the summary in the messaging window upon termination of the messaging session.

9. The system of claim 8, wherein the automated agent attempts to execute the plurality of actions in a backend computing system.

10. The system of claim 8, wherein the automated agent uploads the data associated with the plurality of actions to a server at the termination of the messaging session.

11. The system of claim 8, wherein the processor is further configured to capture a time when the first action was attempted, based on the uploaded data.

12. The system of claim 8, wherein the processor is further configured to display a visual indicator indicating a successful execution of a second action of the plurality of actions in the summary, wherein the visual indicator is displayed adjacent to the description.

13. The system of claim 8, wherein the processor is further configured to store the transcript of the communication between the user and the automated agent.

14. A non-transitory computer-readable medium storing instructions that when executed by one or more processors of a device cause the one or more processors to:

initiate a messaging session between a user and an automated agent;

receive data indicating that the automated agent has attempted to execute a plurality of actions to resolve a request from the user, wherein the request is specified in a communication from the user during the messaging session;

generate, based on the data, a summary comprising:
the request;
a description of the plurality of actions; and
a failure message regarding a first action of the plurality of actions that failed to execute;

insert the summary into a transcript of messages exchanged between the user and the automated agent during the messaging session in response to termination of the messaging session between the user and the automated agent;

generate a user interface that includes a messaging window within which the messaging session is displayed to a live agent; and display the summary in the messaging window upon termination of the messaging session.

15. The non-transitory computer-readable medium of claim 14, wherein the automated agent attempts to execute the plurality of actions in a backend computing system.

16. The non-transitory computer-readable medium of claim 14, wherein the automated agent uploads the data associated with the plurality of actions to a server at the termination of the messaging session.

17. The non-transitory computer-readable medium of claim 14, wherein the instructions when executed by the one or more processors further cause the one or more processors to capture a time when the first action was attempted, based on the uploaded data.

18. The non-transitory computer-readable medium of claim 14, wherein the instructions when executed by the one or more processors further cause the one or more processors to display a visual indicator indicating a successful execution of a second action of the plurality of actions in the summary, wherein the visual indicator is displayed adjacent to the description.

* * * * *